(12) United States Patent
Wielgosz

(10) Patent No.: US 8,888,193 B2
(45) Date of Patent: Nov. 18, 2014

(54) NOISE-REDUCING OR VIBRATION-DAMPING SUPPORT SYSTEM FOR A PUMP FOR A VEHICLE SEAT

(75) Inventor: Gerd Wielgosz, Greding (DE)

(73) Assignee: Faurecia Autositze GmbH (DE)

( * ) Notice: Subject to any disclaimer, the term of this patent is extended or adjusted under 35 U.S.C. 154(b) by 0 days.

(21) Appl. No.: 13/605,347

(22) Filed: Sep. 6, 2012

(65) Prior Publication Data
US 2013/0082497 A1   Apr. 4, 2013

(30) Foreign Application Priority Data
Sep. 30, 2011   (DE) .......................... 10 2011 114 543

(51) Int. Cl.
*A47C 7/02* (2006.01)
*B60N 2/44* (2006.01)

(52) U.S. Cl.
CPC .............. *B60N 2/448* (2013.01); *B60N 2/4415* (2013.01); *Y10S 297/03* (2013.01)
USPC ..................... 297/452.41; 297/DIG. 3; 24/458

(58) Field of Classification Search
USPC .............................. 297/452.41, 284.6, DIG. 3
See application file for complete search history.

(56) References Cited

U.S. PATENT DOCUMENTS

| | | | | | |
|---|---|---|---|---|---|
| 613,328 | A | * | 11/1898 | Shryock ............................. | 5/644 |
| 5,458,303 | A | * | 10/1995 | Ruckwardt .................. | 248/74.2 |
| 5,637,076 | A | * | 6/1997 | Hazard et al. ..................... | 601/5 |
| 5,687,438 | A | * | 11/1997 | Biggie et al. ....................... | 5/654 |
| 6,070,973 | A | * | 6/2000 | Sachs et al. ..................... | 347/75 |
| 6,916,300 | B2 | * | 7/2005 | Hester et al. .................. | 601/149 |
| 7,658,350 | B2 | * | 2/2010 | Bauer .............................. | 248/65 |
| 8,064,201 | B2 | * | 11/2011 | Kuo et al. ..................... | 361/700 |
| 8,359,715 | B2 | * | 1/2013 | Turner et al. .................... | 24/297 |
| 2004/0113027 | A1 | * | 6/2004 | Nakanishi .................... | 248/68.1 |
| 2004/0144897 | A1 | * | 7/2004 | Maruyama .................... | 248/68.1 |
| 2005/0260104 | A1 | * | 11/2005 | Culbert et al. ................ | 422/121 |
| 2010/0223765 | A1 | * | 9/2010 | Vitali .............................. | 24/297 |

FOREIGN PATENT DOCUMENTS

| | | |
|---|---|---|
| DE | 102008020436 | 10/2009 |
| DE | 102009017300 | 3/2010 |
| EP | 0035656 | 9/1981 |
| JP | 2009225843 | 10/2009 |

* cited by examiner

*Primary Examiner* — David E Allred
(74) *Attorney, Agent, or Firm* — Bourque and Associates, PA

(57) ABSTRACT

A vehicle seat includes a pump for operating a seat cushion adjuster or a seat massage system and a seat frame structure. The pump is coupled to an electrical supply line and a pressure line. The pump is designed without a soundproofing enclosure. At least one noise-reducing or vibration-damping coupling device is provided. The coupling device and pump being attached via a first section to the seat frame structure. The coupling device is attached directly to the pressure line of the pump or to the electrical supply line of the pump via a second section.

7 Claims, 1 Drawing Sheet

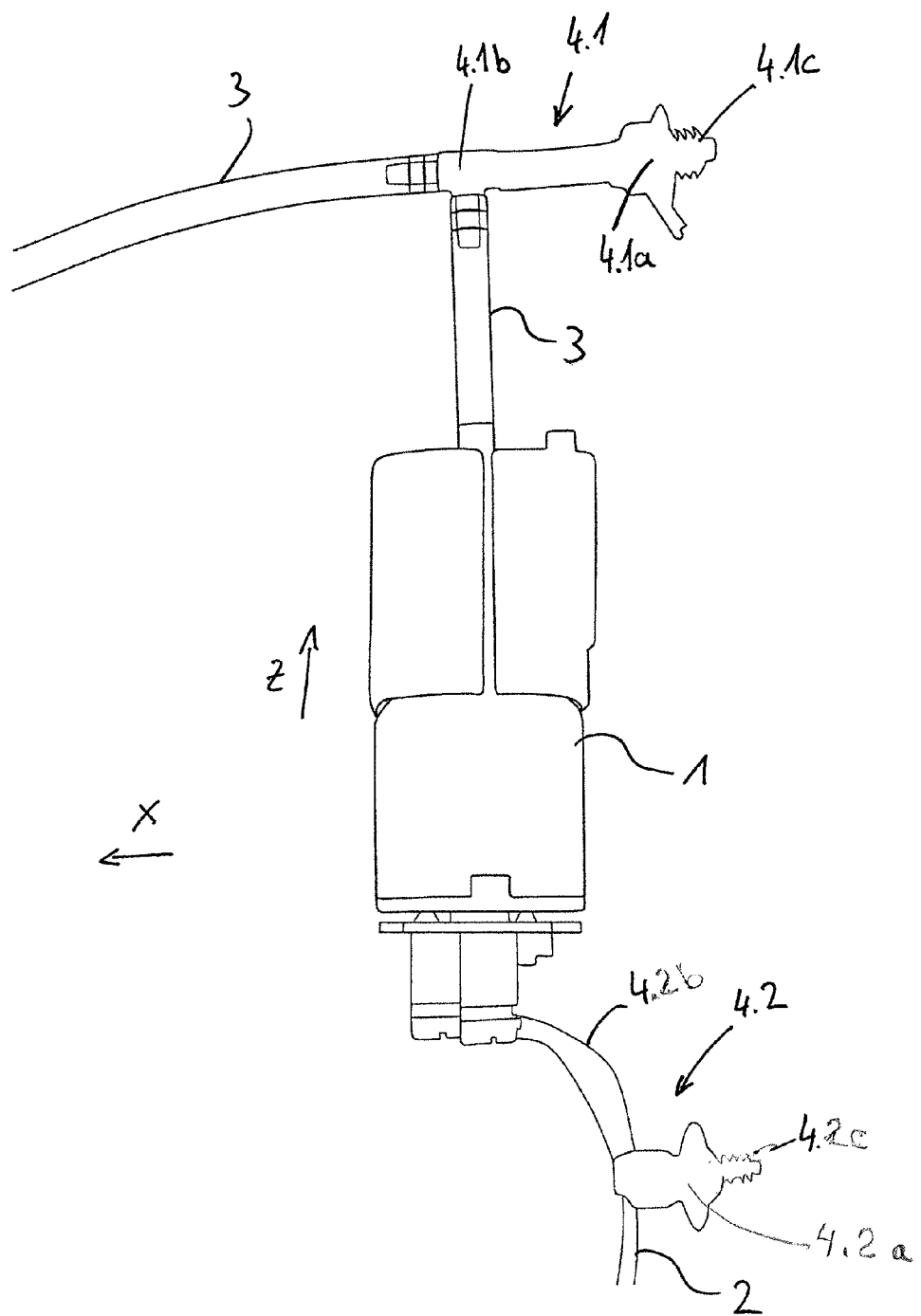

NOISE-REDUCING OR VIBRATION-DAMPING SUPPORT SYSTEM FOR A PUMP FOR A VEHICLE SEAT

TECHNICAL FIELD

The invention relates to a vehicle seat and more particularly, to a system for providing a vehicle seat adjustment pump that is suspended from a supply line without need for a sound-proofing enclosure.

BACKGROUND INFORMATION

Vehicle seats are often fitted with pneumatic pumping systems for adjusting seat cushions (lumbar support adjustment) or for operating massage devices integrated into the seat. Associated pumps, which are operated using an electrical motor, are usually connected to the seat structure and thus create disturbing noises as a result of the vibrations and of the propagating sound during the pump operation. To reduce this effect, the pumps are typically—for example, as known from DE 10 2 009 017 300 A1 or EP 0035656 A1—housed in soundproofing enclosures, which are designed such that to the extent possible the sound cannot escape from the enclosure, and the vibrations cannot be transferred to the structure to which the enclosure is attached, resulting—in the worst case—in natural vibrations also being excited by the involved structural parts, and the occurring case of resonance even intensifying the noise. It is also known to embed the pump in a foam or leather pouch and to attach this pouch to the seat structure. This increases the outer surface of the pump, which creates a diaphragm effect, which transports the sound outwards such that the sound is amplified in particular in the middle frequency range and is perceived as loud by the occupants of the vehicle.

Finally, DE 10 2008 020 435 A1 discloses an enclosure-free holder for pumps, which employs a rubber sleeve surrounding the pump body and supporting the pump in a flexible manner. The rubber sleeve surrounding the pump body is connected to a holding device that is to be attached to a vehicle part via U-shaped mounting brackets. The flexible connection of the pump to the vehicle structure dampens the vibrations of the pump and thus reduces the development of noise. However, the holder must still be attached to the pump such that a transfer of vibrations of the pump via the rubber sleeve directly into the vehicle structure is initiated. In addition, a matching sleeve must be provided for each pump size.

SUMMARY OF THE INVENTION

It is, therefore, the objective of the present invention to specify a vehicle seat of the above-mentioned type that can be used to achieve an effective noise reduction and where the suspension of the pump is largely independent of the size of the used pump.

According to the invention, the pump is designed without a soundproofing enclosure and exhibits at least one noise-reducing or vibration-damping coupling device, which is mounted or attached directly to the seat structure on the one hand and on the other hand directly to the supply line or discharge line of the pump. In this manner, a bothersome soundproofing enclosure can be omitted and the pump is suspended freely at the respective seat structure of the vehicle seat. In addition, a holder at the pump body can be omitted such that the transfer of pump vibrations during operation can be minimized. The coupling device according to the invention exhibits noise-reducing properties such that the vibrations of the pump are not transferred to the seat structure or are transferred in a greatly reduced manner. Moreover, because the pump has no sound proofing enclosure, there is also no resonating body.

BRIEF DESCRIPTION OF THE DRAWINGS

These and other features and advantages of the present invention will be better understood by reading the following detailed description, taken together with the drawings wherein;

FIG. 1—shows a schematic view of a preferred embodiment of the invention.

DETAILED DESCRIPTION OF THE PREFERRED EMBODIMENTS

The embodiment of the invention shown in FIG. 1 (the seat structure of the vehicle seat and the vehicle seat itself are not shown) is particularly suited for vertical mounting of the pump 1, i.e., the pump 1 is suspended such that its longitudinal axis Z is perpendicular to the direction of travel X.

The pump 1 comprises a drive motor not shown in detail here, which is supplied with electricity via the supply line 2. The pump 1 is preferably a pneumatic pump; hydraulic pumps are also conceivable, which feeds a pressure line 3. The pressure line 3 leads to the seat adjustment (lumbar support adjustment) to be addressed or to a massage device, which is also not shown in more detail here. The pump 1 is connected directly to the seat frame without soundproofing enclosure. In the example shown, this is accomplished using a first coupling device 4.1. Advantageously, the corner piece is utilized, which is commonly used in such a pump arrangement and which connects the two sections of the pressure line 3. According to the invention, the corner piece is extended advantageously to a T-shaped coupling device 4.1, wherein the one leg of the T-cross stroke establishes thereby the connection to the seat structure. The coupling device 4.1 includes a section 4.1c, which may be designed as a clip and which is connected to the seat structure. By means of an additional section 4.1b, the coupling device 4.1 is connected to the pump 1. Here, the coupling device 4.1 exhibits the form of a T-piece, preferably made of plastic, which has hose fittings at two ends, said hose fittings being connected to the pressure line 3 by the hoses that serve as the pressure line being slipped onto the sleeves. The third end of the T-piece is closed and exhibits the section 4.1c, which is preferably injection-molded. In this manner, the first part of the pressure line 3 and also independent thereof the preferably flexibly or resiliently designed section 4.1a of the coupling device 4.1 serves as a noise dampener, such that vibrations of the pump cannot be transferred to the coupling element 4.1 on the seat structure or can be transferred in a weakened manner only.

The flexibility of the coupling device 4.1 can also be realized through a hose section 3, which is designed to be flexible and by a section that is otherwise designed more or less rigid and not flexible.

In addition, because of the freely suspended, enclosure-less mounting of the pump, the vibrations of the pump 1 do not excite additional areas that could otherwise cause unwanted noise.

In the example shown, another coupling device 4.2 is connected to the supply line. At one end this coupling device 4.2 in turn exhibits a section 4.2c that serves the purpose of connecting to the seat structure and can be designed similarly to the above-described section 4.1c.

The coupling device 4.2 is connected to the supply line 2, which, in the example shown, is located at the end of the pump that is opposite the pressure line 3. For this purpose, the coupling device exhibits a connecting section 4.2b, which in this case is designed as a shrink hose, such that the connection between the coupling device 4.2 and pump 1 is established by shrinking of the shrink hose. Also with this coupling device 4.2 vibrations can be dampened and noise reduced. Furthermore, as described above, an additional elastic or resilient element can be provided between the section 4.2b and 4.2c. This type of attachment creates a second mounting point for the pump 1 at the seat structure and allows the creation of a defined installing position of the pump 1 at the seat structure.

Modifications and substitutions by one of ordinary skill in the art are considered to be within the scope of the present invention, which is not to be limited except by the following claims.

The invention claimed is:

1. A noise-reducing or vibration-damping support system for a pump (1) for a vehicle seat, said pump (1) responsive to activation by a pressurized fluid medium provided by a pressure supply line (3), said pump (1) configured for operating seat cushion adjusters or seat massage systems in a vehicle seat frame structure, wherein the pump (1) is electrically coupled to an electrical supply line (2) and fluidly coupled to said pressure supply line (3), said pressure supply line (3) including a first pressure supply line segment and a second pressure supply line segment, wherein the pump (1) is designed without a soundproofing enclosure and wherein at least one noise-reducing or vibration-damping coupling device (4.1; 4.2) suspending and supporting said pump (1) is provided, wherein said at least one noise-reducing or vibration damping coupling device (4.1; 4.2) is attached to the vehicle seat frame structure, said noise-reducing or vibration-damping support system characterized in that a first noise-reducing or vibration-damping coupling device (4.1) from among said at least one noise-reducing or vibration damping coupling device (4.1; 4.2) is fluidly coupled directly between said first and said second pressure supply line segments (3) and configured to form an integral part of said pressure supply line (3) carrying said pressurized fluid medium to said pump (1).

2. The noise-reducing or vibration-damping support system for a pump (1) for a vehicle seat as set forth in claim 1, characterized in that said at least one noise-reducing or vibration-damping coupling device (4.1; 4.2) exhibits a flexible section (4.1a; 4.2a) and a vehicle seat frame structure connection section (4.1c; 4.2c) designed as an attachment section for the attachment of said at least a one noise-reducing or vibration-damping coupling device (4.1; 4.2) to the seat frame structure.

3. The noise-reducing or vibration-damping support system for a pump (1) for a vehicle seat as set forth in claim 2, characterized in that the flexible section (4.1a; 4.2a) exhibits a hose section.

4. The noise-reducing or vibration-damping support system for a pump (1) for a vehicle seat as set forth in claim 3, characterized in that at least a portion of the hose section (4.2a) is designed as a shrink hose.

5. The noise-reducing or vibration-damping support system for a pump (1) for a vehicle seat as set forth in claim 1, characterized in that said noise-reducing or vibration-damping support system for a pump (1) comprises said first noise-reducing or vibration-damping coupling device (4.1) and a second noise-reducing or vibration-damping coupling device (4.2), whereby the second noise-reducing or vibration-damping coupling device (4.2) is attached directly to the electrical supply line (2) of the pump (1).

6. The noise-reducing or vibration-damping support system for a pump (1) for a vehicle seat as set forth in claim 5, characterized in that the second coupling device (4.2) is connected to the electrical supply line (2) of the pump (1) by means of a shrink hose.

7. A vehicle seat as set forth in claim 2, characterized in that the vehicle seat frame structure connection section (4.1c; 4.2c) is configured as an injection-molded clip.

* * * * *